United States Patent
Lai et al.

(10) Patent No.: US 11,687,275 B2
(45) Date of Patent: Jun. 27, 2023

(54) METHOD FOR ASSIGNING PLURALITY OF CHANNELS OF STORAGE DEVICE FOR STREAM DATA WRITING, STORAGE DEVICE AND STORAGE MEDIUM

(71) Applicant: SK hynix Inc., Icheon-si (KR)

(72) Inventors: Ching-Chung Lai, Zhubei (TW); Lian-Chun Lee, Zhubei (TW); Chun-Shu Chen, Zhubei (TW)

(73) Assignee: SK hynix Inc., Icheon-si (KR)

( * ) Notice: Subject to any disclaimer, the term of this patent is extended or adjusted under 35 U.S.C. 154(b) by 89 days.

(21) Appl. No.: 17/529,907

(22) Filed: Nov. 18, 2021

(65) Prior Publication Data

US 2022/0197543 A1    Jun. 23, 2022

(30) Foreign Application Priority Data

Dec. 21, 2020    (TW) .................................. 109145265

(51) Int. Cl.
*G06F 3/00*    (2006.01)
*G06F 3/06*    (2006.01)

(52) U.S. Cl.
CPC .......... G06F 3/0655 (2013.01); G06F 3/0604 (2013.01); G06F 3/0679 (2013.01)

(58) Field of Classification Search
None
See application file for complete search history.

(56) References Cited

U.S. PATENT DOCUMENTS

| | | | |
|---|---|---|---|
| 2014/0215129 A1 | 7/2014 | Kuzmin et al. | |
| 2018/0190329 A1 | 7/2018 | Kathawala et al. | |
| 2018/0356997 A1 | 12/2018 | Gorobets et al. | |
| 2020/0081648 A1 | 3/2020 | Bernat et al. | |

FOREIGN PATENT DOCUMENTS

| | | | |
|---|---|---|---|
| CN | 107430493 A | | 12/2017 |
| CN | 108733319 A | | 11/2018 |
| CN | 114691017 A | * | 7/2022 |
| KR | 1020200087713 A | | 7/2020 |
| WO | 2019203915 A1 | | 10/2019 |
| WO | 2020174428 A2 | | 9/2020 |

* cited by examiner

*Primary Examiner* — Midys Rojas
(74) *Attorney, Agent, or Firm* — William Park & Associates Ltd.

(57) ABSTRACT

A method for assigning a plurality of channel of a storage device for stream data writing, a storage device and a storage medium are provided. The method includes: providing global available channel status data and stream suitable channel status data for one of a plurality of streams by a controller of the storage device for processing stream data writing for the plurality of streams; generating stream available channel status data for the one of the plurality of streams, based on the global available channel status data and the stream suitable channel status data for the stream; selecting at least one available channel of the plurality of channels according to the stream available channel status data; and updating the global available channel status data with respect to the at least one available channel selected and updating the stream suitable channel status data for one of the plurality of streams.

11 Claims, 12 Drawing Sheets

FIG. 12

METHOD FOR ASSIGNING PLURALITY OF CHANNELS OF STORAGE DEVICE FOR STREAM DATA WRITING, STORAGE DEVICE AND STORAGE MEDIUM

CROSS-REFERENCE TO RELATED APPLICATION

This application claims priority under 35 U.S.C. § 119 to Taiwanese Patent Application No. 109145265 filed on Dec. 21, 2020, which is incorporated herein by reference in its entirety.

BACKGROUND OF THE INVENTION

1. Field of the Invention

The present disclosure relates to an electronic device, and in particular to a method for assigning a plurality of channels of a storage device for stream data writing, a storage device and a storage medium.

2. Description of the Related Art

Non-volatile storage devices, such as a storage device based on flash memories, are extensively utilized on electronic devices because data stored in a non-volatile storage device does not disappear even after the power is off and the non-volatile storage device features power saving ability and a small volume. Moreover, a non-volatile storage device, such as a solid storage device (SSD), has also gradually become a storage device equipped in a computer system such as a desktop computer, a laptop computer, and a server.

An electronic device (or to be referred to as a host), when executing an application program so as to store various data such as text, data or photos, or play audios and videos, frequently needs to raise a large amount of requests to write or read data to a storage device (e.g., SSD). To increase the capacity and performance of a storage device such as an SSD, the number of memory chips and the number of channels in the SSD are correspondingly increased. An SSD controller performs interleaving page read or write operations through multiple channels and memory chips by using these memory chips, hence achieving high-performance input/output operations.

However, in a practical application scenario, in the event that multiple application programs simultaneously or at close timings raise requests for writing large amounts of data, data to be written by these different applications is irregularly transmitted as random data to the SSD. The SSD can only sequentially assigning the received data into the memory chips of the multiple channels for storage. It is possible that the data intended to be written by one of the multiple applications above is assigned to and stored in memory chips of fewer among the multiple channels. As such, when said data needs to be read, reading is performed correspondingly from the memory chips of the fewer channels. Accordingly, the input/output operation efficiency may be degraded.

BRIEF SUMMARY OF THE INVENTION

Embodiments provide a method for assigning a plurality of channels of a storage device for stream data writing, a storage device and a storage medium, which are capable of implementing assignment related to write operations and are suitable for processing write operations of a plurality of streams of application programs from a host to provide individual assignment for the write operation of at least one of the streams, hence facilitating more even distribution and storage of write data corresponding to the stream in memory chips of a plurality of channels of a storage device. Thus, improvement on the performance of reading the data of the stream from the memory device can be facilitated.

A method for assigning a plurality of channels of a storage device for stream data writing is provided according to an embodiment. The method includes: (a) providing global available channel status data and stream suitable channel status data for one of a plurality of streams by a controller of the storage device for processing stream data writing for the plurality of streams, wherein the global available channel status data indicates whether each of the plurality of channels has been assigned for stream data writing, and the stream suitable channel status data indicates whether each of the plurality of channels has been assigned for stream data writing for the one of the plurality of streams; (b) generating, by the controller, stream available channel status data for the one of the plurality of streams, based on the global available channel status data and the stream suitable channel status data for the stream, wherein the stream available channel status data for the stream indicates whether each of the plurality of channels is available for stream data writing for the one of the plurality of streams; (c) selecting, by the controller, at least one available channel of the plurality of channels according to the stream available channel status data for the stream; (d) updating the global available channel status data with respect to the at least one available channel selected to indicate that the at least one available channel selected has been assigned for stream data writing; and (e) updating the stream suitable channel status data for one of the plurality of streams with respect to the at least one available channel selected to indicate that the at least one available channel selected has been assigned for stream data writing for the one of the plurality of streams.

In some embodiments, the controller is used to assign the plurality of channels for stream data writing of the plurality of streams, and provide respective stream suitable channel status data for the plurality of streams.

In some embodiments, after the controller performs the steps (b) to (e) for the one of the plurality of streams, the controller performs the steps (b) to (e) for another of the plurality of streams.

In some embodiments, after the step (e), the method further includes: sending a notification to perform write operation for the one of the plurality of streams and the at least one available channel selected.

In one embodiment, the method further includes: when the global available channel status data indicates that each of the channels has been assigned for stream data writing, sending a notification to perform write operation for the plurality of channels.

A storage medium is further provided according to another embodiment. The storage medium stores program instructions that are capable of causing a storage device to perform the method for assigning a plurality of channels of a storage device for stream data writing according to any one of the embodiments described above.

A storage device is further provided according to another embodiment. The storage device includes a plurality of memory chips and a controller. The controller is coupled to the plurality of memory chips through a plurality of channels, and is for processing stream data writing for a plurality of streams, wherein the controller is configured to perform a plurality of operations. The plurality of operations include:

(a) providing global available channel status data and stream suitable channel status data for one of the plurality of streams, wherein the global available channel status data indicates whether each of the channels has been assigned for stream data writing, and the stream suitable channel status data indicates whether each of the plurality of channels has been assigned for stream data writing for the one of the plurality of streams; (b) generating stream available channel status data for the one of the plurality of streams, based on the global available channel status data and the stream suitable channel status data for the one of the plurality of streams, wherein the stream available channel status data for the one of the plurality of streams indicates whether each of the channels is available for stream data writing for the one of the plurality of streams; (c) selecting at least one available channel according to the stream available channel status data for the stream; (d) updating the global available channel status data with respect to the at least one available channel selected to indicate that the at least one available channel selected has been assigned for stream data writing; and (e) updating the stream suitable channel status data for the stream with respect to the at least one available channel selected to indicate that the at least one available channel selected has been assigned for stream data writing for the one of the plurality of streams.

In one embodiment, the controller is used to assign the plurality of channels for the stream data writing of the plurality of streams, and provide respective stream suitable channel status data for the plurality of streams.

In one embodiment, after the controller performs the operations (b) to (e) for the one of the plurality of streams, the controller performs the operation (b) to (e) for another of the plurality of streams.

In one embodiment, after the operation (e), the plurality of operations further include: sending a notification to perform stream data writing for the one of the plurality of streams and the at least one available channel selected.

In one embodiment, the plurality of operations further include: when the global available channel status data indicates that each of the channels has been assigned for stream data writing, sending a notification to perform write operation for the plurality of channels.

Accordingly, the embodiments above provide a method for assigning a plurality of channels of a storage device for stream data writing, a storage device and a storage medium, which are capable of implementing assignment related to write operations and are suitable for processing write operations of steams of a plurality of application programs from a host, so as to provide individual assignment for the write operation of at least one of the streams.

BRIEF DESCRIPTION OF THE DRAWINGS

FIG. 12 is a schematic diagram of an example when a particular stream of data is output by a storage device according to the example of the write data arrangement of FIG. 11.

DETAILED DESCRIPTION OF THE INVENTION

Figure 1:
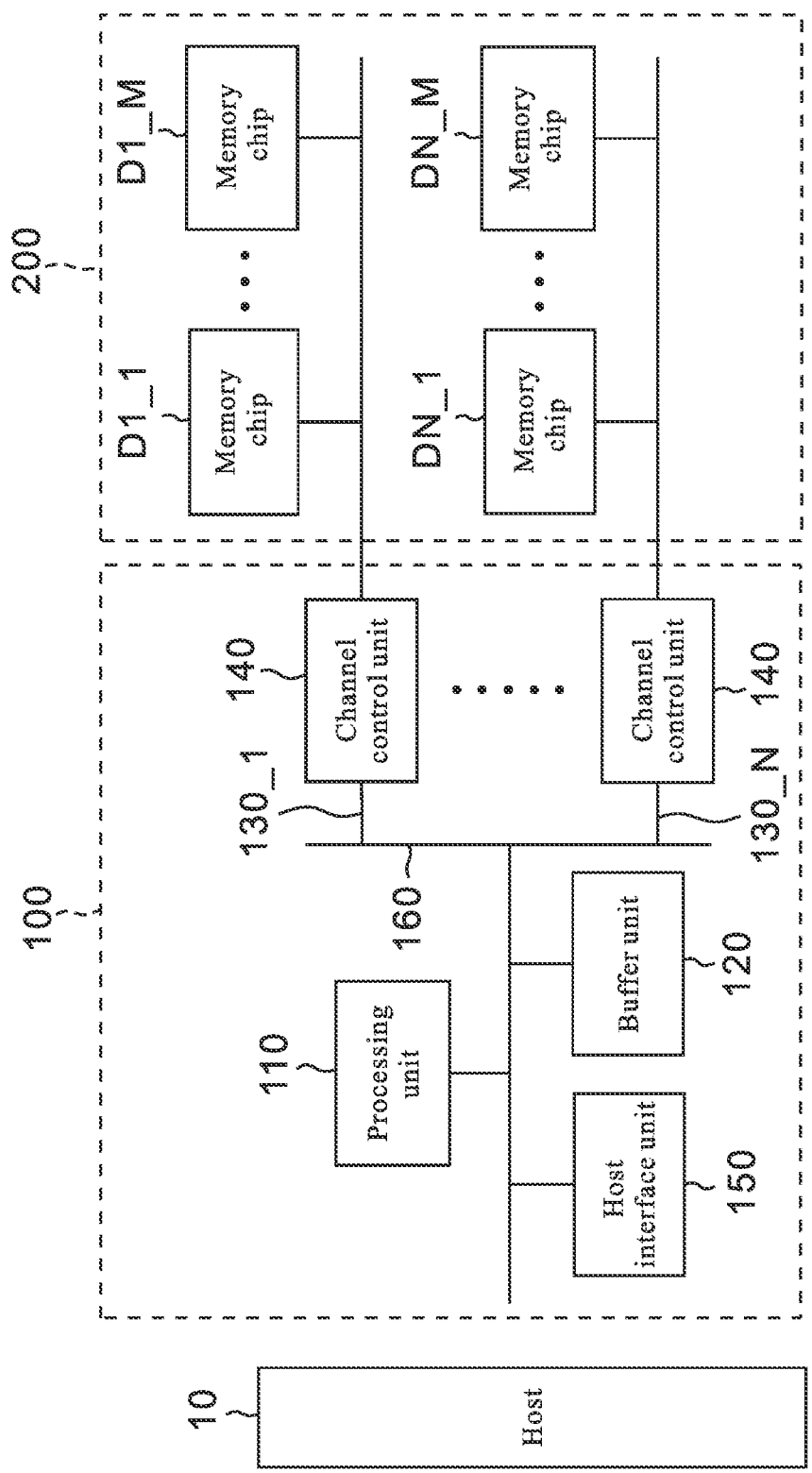
FIG. 1 is a schematic block diagram of a storage device according to an embodiment.
Figure 2:
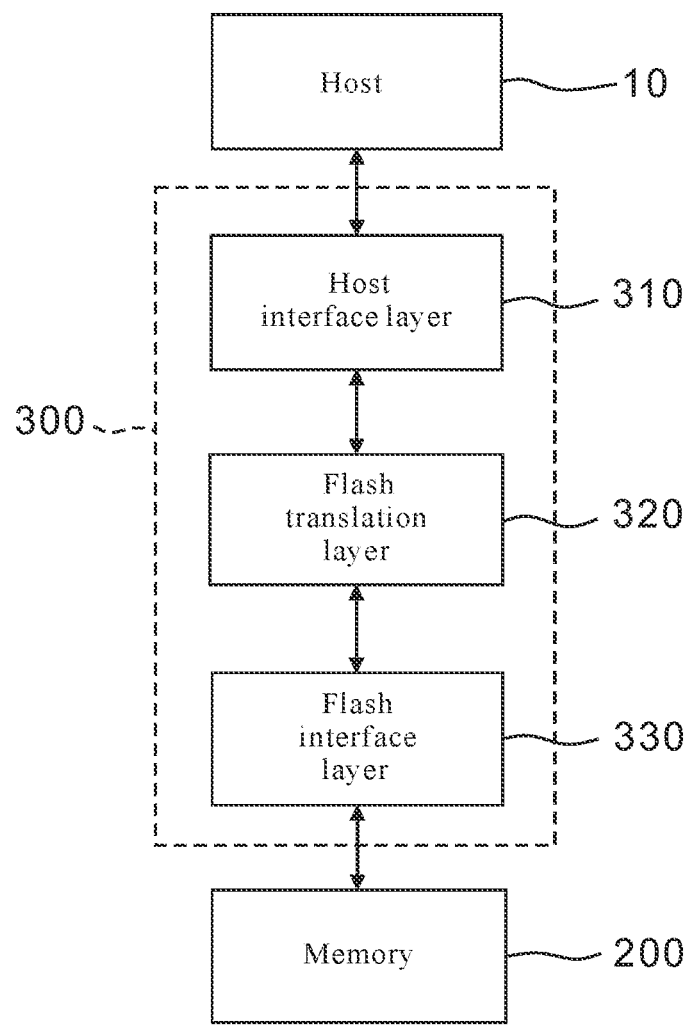
FIG. 2 is a schematic block diagram of a controller according to an embodiment.

To facilitate understanding of the object, characteristics and effects of this present disclosure, embodiments together with the attached drawings for the FIG. 1 shows a storage device according to an embodiment of the present invention. The storage device in FIG. 1 can be used to perform a method for assigning a plurality of channels of a storage device for stream data writing in FIG. 3 or related embodiments (detailed description is to be given below and is skipped for the time being), and are suitable for processing write operations of a plurality of streams of application programs from a host to provide individual assignment for the write operation of at least one of the streams, hence facilitating more even distribution and storage of write data corresponding to the stream in memory chips of a plurality of channels of a storage device. FIG. 1 and FIG. 2 depict examples of suitable application scenarios for implementation according to the present invention; it should be noted that the implementation is not limited to the examples.

As shown in FIG. 1, the storage device includes a controller 100 and a memory 200. The controller 100 includes a processing unit 110, a buffer unit 120, a plurality of channels 130_1 to 130_N (wherein N is an integer greater than 1, for example) and corresponding channel control units 140. The buffer unit 120 may be implemented by a volatile memory or a non-volatile memory. The memory 200 includes a plurality of memory chips D1_1-D1_M to DN_1-DN_M (where N and M are integers greater than 1, for example). For example, the memory chip is a flash memory, e.g., a NOR memory or a NAND memory; however, the implementation of the present invention is not limited to the examples above.

The controller 100 can receive a read request or a write request from a host 10 by way of communicating with the host 10 through a host interface unit 150. The controller 100 generates a corresponding read command or write command corresponding to the host read request or the host write request, and sends the corresponding command generated to the channel control unit 140 of the corresponding channel (for example, 130_1 to 130_N). The storage control channel unit 140 is for controlling at least one memory chip. For example, the channel control unit 140 sends a data read command to one of the memory chips and sends data read accordingly into the controller 100, for example, into the buffer unit 120. The controller 100 sends the data requested by the host 10 to the host 10. For another example, the channel control unit 140 writes, according to a data write command, data to be written into the memory chip. When the controller 100 controls an operation of the memory 200, the buffer unit 120 may store data used by the controller 100 and the memory 200 for various operations, such as a read operation, a write operation, a programming operation and an erase operation. In FIG. 1, the plurality of channel control units 140 perform read or write operations by way of parallel processing. Moreover, the processing unit 110 may be electrically coupled to the channels (e.g., 130_1 to 130_N) through a bus 160. However, the implementation of the present invention is not limited to the examples above. For example, each of the channel control units may be implemented by a logic circuit or a programmable circuit, or be implemented in the form of software and be executed by the processing unit 110.

The host interface unit 150 may process commands and data provided from the host 10, and may communicate with the host 10 by at least one of various interface protocols including Universal Serial Bus (USB), Multimedia Card (MMC), Peripheral Component Interconnect Express (PCI-E), Serial Connection SCSI (SAS), Serial Advanced Technology Connection (SATA), Parallel Advanced Technology Connection (PATA), Small Computer System Interface (SCSI), Enhanced Small Disk Interface (ESDI) and Integrated Drive Circuit (IDE), Advanced Host Controller Interface (AHCI) and Non-Volatile Memory express (NVMe).

Refer to both FIG. 1 and FIG. 2. FIG. 2 shows a schematic block diagram of a controller according to an embodiment. FIG. 2 shows the architecture of the controller 300 implemented in the form of firmware or software. For example, the controller 300 includes a host interface layer 310, a flash translation layer 320, and a flash interface layer 330. The host interface layer 310 is for communicating with the host 10 and serves as an interface between the host 10 and the controller 300. The flash translation layer 320 is for managing read, write and erase operations. The flash translation layer 320 is further for translating a logical address (for example, a logical block address or a logic page address) to a physical address (for example, a physical block address or a physical page address) corresponding to the memory chips (for example, D1_1 to D1_M to DN_1 to DN_M) of the memory 200. The flash interface layer 330 is for processing communication between the flash translation layer 320 and the memory 200, for example, sending a command from the flash translation layer 320 to the memory 200.

The controller 300 in FIG. 2 may be implemented by using the hardware architecture in FIG. 1. The flash translation layer 320 needs to refer to and maintain an address mapping table when performing logical-to-physical address translation. Due to a large data amount of an address mapping table, the flash translation layer 320 stores a partial section of the address mapping table in a cache. When the cache does not contain the correspondence between logical addresses and physical addresses needed for translation, the flash translation layer 320 updates the contents of the section of the address mapping table in the cache and hence generates a mapping table read command. Moreover, in application scenarios of some memory products, such as eMMC or other memory products, the address mapping table is stored in a memory of the memory product; however, the present invention is not limited to the examples above.

The controller 300 controls various operations with respect to the memory 200, for example, a write operation, a read operation, a programming operation and an erase operation. For example, the controller may generate a write command in response to a write request of the host 10, and execute the write command generated. The controller may store host write commands using a command queue. The controller may sequentially process and host write commands stored in the command queue so as to perform a data write operation.

In addition, the controller 300 can further control a firmware algorithm for the flash translation layer 320. For example, the controller 300 may realize algorithms of garbage collection (GC), wear-leveling (WL), block reclaim (BC) and runtime bad block (RBB).

FIG. 1 and FIG. 2 are for illustrating suitable application scenarios for implementation according to the present invention; however, it should be noted that the implementation of the present invention is not limited to the examples. In a practical application scenario, the host may execute multiple application programs, and these application programs may simultaneously or at close timings raise requests for writing large amounts of data. These data write requests are irregularly transmitted as random to a storage device (e.g., an SSD), for example, in a write buffer of a storage device. In order to individually assign the write operation of at least one of these streams so as to more evenly store write data corresponding to the stream in memory chips of a plurality of channels, a method for assigning a plurality of channels of a storage device for stream data writing is provided according to an embodiment.

Figure 3:
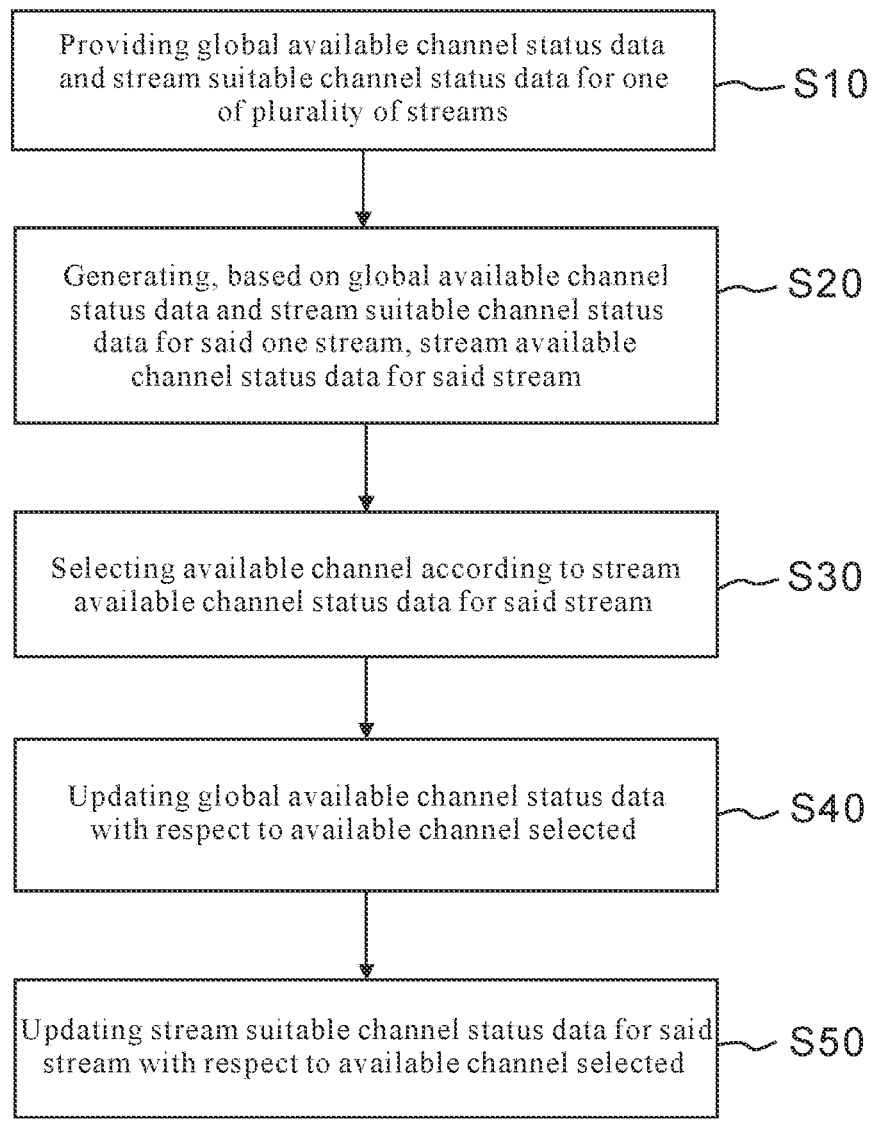
FIG. 3 is a flowchart of a method for assigning a plurality of channels of a storage device for stream data writing according to an embodiment.

FIG. 3 is a flowchart of a method for assigning a plurality of channels of a storage device for stream data writing according to an embodiment. Referring to FIG. 1 and FIG. 3, the method according to the embodiment in FIG. 3 includes steps S10 to S50 below. Elements in FIG. 1 are referenced as examples for assisted description; however, the implementation of the method is not limited by the examples.

As shown in step S10, the controller 100 provides global available channel status data and stream suitable channel status data for one of the plurality of streams, wherein the global available channel status data indicates whether each of the channels has been assigned for stream data writing, and the stream suitable channel status data indicates whether each of the plurality of channels has been assigned for stream data writing for the one of the plurality of streams.

As shown in step S20, the controller 100 generates stream available channel status data for the one of the plurality of streams, based on the global available channel status data and the stream suitable channel status data for the stream, wherein the stream available channel status data for the stream indicates whether each of the channels is available for stream data writing for the stream.

As shown in step S30, the controller 100 selects an available channel according to the stream available channel status data for the stream.

As shown in step S40, the global available channel status data is updated with respect to the available channel selected to indicate that the available channel selected has been assigned for stream data writing.

As shown in step S50, the stream suitable channel status data for the stream is updated with respect to the available channel selected to indicate that the available channel selected has been assigned for stream data writing for the stream.

It is known from steps S10 to S50 above that, the method in FIG. 3 individually assigns the write operation of at least one of these streams so as to more evenly distribute and store write data corresponding to the stream in the memory chips of the plurality of channels.

Examples are further given below to describe various implementation approaches of the method in FIG. 3.

In some embodiments, the controller 100 is used to assign the plurality of channels for stream data writing of the plurality of streams; the stream in step S10 to step S50 is one of the plurality of streams, and the controller 100 provides individual stream suitable channel status data for the plurality of streams, respectively. For example, in some application scenarios, for example, the host is allowed to associate each write operation with a stream, each stream may be regarded as being corresponding to an application program, and related stream information is carried in a request for a write operation associated with the stream, for example, an identifier or any appropriate information that helps a controller of a storage device to identify different streams. For example, write data from a host, accompanied with a corresponding stream identifier, is stored in a write buffer of a storage device, and write data of one particular stream may be from the same file or application program and is sequential data. When a plurality of application programs simultaneously transmit sequential data of different streams to a storage device, the method for a storage device of the embodiment may be configured to individually assign the sequential data in each of the streams, hence more evenly distribute and store the sequential data corresponding to the plurality of streams in memory chips of a plurality of channels of the storage device.

Figure 4:
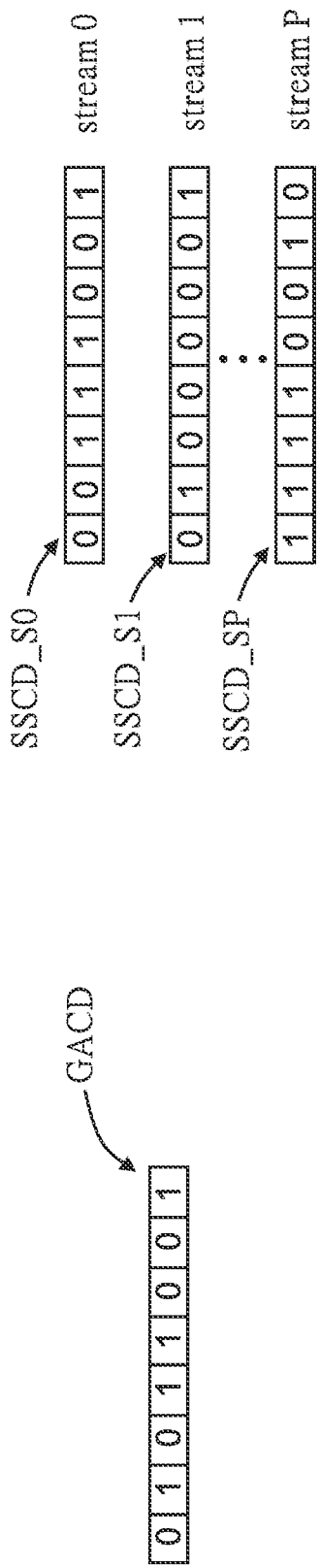
FIG. 4 is a schematic diagram of an embodiment of step S10 in FIG. 3.

In detail, FIG. 4 shows a schematic diagram of an embodiment of step S10 in FIG. 3. In FIG. 4, the controller provides two different types of status data to help in assigning write operations. The first type of data is global available channel status data (GACD). The second type of data is stream suitable channel status data (SSCD). In the embodiment in FIG. 4, there are P+1 streams (where P is a non-zero positive integer), and the controller provides stream suitable channel status data (for example, represented by SSCD_S0, SSCD_S1 to SSCD_SP) of streams 0, 1 to P, respectively. The status data above may be represented by bitmaps, bytes, values, symbols, tables or any appropriate data structures. For illustration purposes, in FIG. 4 or related drawings and the embodiments, bitmaps are used as examples to represent the status data; however, the implementation of the present invention is not limited to these examples. In the embodiment in FIG. 4, the storage device in FIG. 1 has a total of 8 channels from channels 0 to 7, for example. Thus, 8 bits of the global available channel status data (GACD) from left to right indicate whether each of the channels 0 to 7 has been assigned for stream data writing. For example, bit 0 indicates that the channel is unavailable, and bit 1 indicates that the channel is available. In addition, the stream suitable channel status data SSCD_S0 indicates whether each of the channels 0 to 7 has been assigned for stream data writing for the stream 0. For example, bit 0 indicates that the channel is unsuitable, and bit 1 indicates that the channel is suitable. The expression "the channel is suitable" means that the channel has not been assigned for stream data writing for the stream 0 in the current assignment process, and if the channel is used, write data will be assigned with a channel that is not previously used and the same channel is not repeatedly used; thus, for the current assignment process, the channel is suitable. The expression "the channel is unsuitable" means that the channel has been assigned for stream data writing for the stream 0 before the current assignment process (for example, the previous assignment process), and with respect to the current assignment process, the same channel will be repeated used for the write data if the channel is used; thus, the channel is unsuitable. Similarly, the stream suitable channel status data SSCD_S1 indicates whether each of the plurality of channels 0 to 7 has been assigned for stream data writing for the stream 1, and so forth, the stream suitable channel status data SSCD_SP indicates whether each of the plurality of channels 0 to 7 has been assigned for stream data writing for the stream P.

Moreover, for a practical application scenario, the controller 100 may need to respectively perform the assignment process for many times for individual streams according to the method in FIG. 3, in order to process stream data writing of the plurality of streams.

Figure 5:
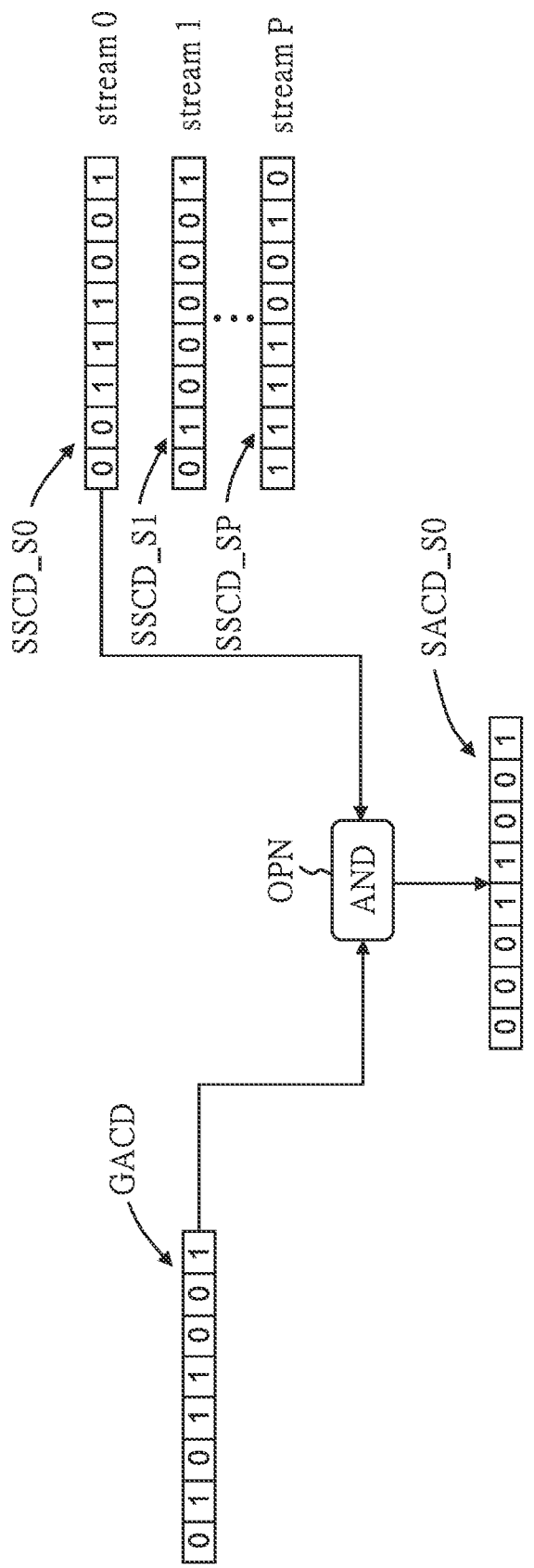
FIG. 5 is a schematic diagram of an embodiment of step S20 in FIG. 3.

Refer to FIG. 5, which shows a schematic diagram of an embodiment of step S20 in FIG. 3. As shown in FIG. 5, the controller 100 generates, based on the global available channel status data (GACD) and the stream suitable channel status data (e.g., SSCD_S0) for a particular stream (e.g., the stream 0), the stream available channel status data (SACD) (for example, represented by SACD_S0) for the stream (e.g., the stream 0). The stream available channel status data SACD_S0 of the stream 0 indicates whether each of the channels 0 to 7 has been assigned for stream data writing for the stream 0. For example, bit 0 indicates that the channel is unavailable, and bit 1 indicates that the channel is available. According to step S20, the controller 100 performs a data operation OPN to generate the stream available channel status data SACD_S0 for the stream 0, based on the global available channel status data GACD and the stream available channel status data SSCD_S0 of the stream 0. In this embodiment, the data operation OPN is, for example, a bitwise AND operation. As shown in FIG. 5, the global available channel status data (GACD) is "01011001", the stream suitable channel status data SSCD_S0 for the stream 0 is "00111001", and the stream available channel status data SACD_S0 is "00011001". In some embodiments, the data operation OPN can be implemented by other appropriate bitwise logic operations, and the meaning represented by the bits may be defined otherwise. Therefore, the implementation of the present invention is not limited to the examples above.

Figure 6:
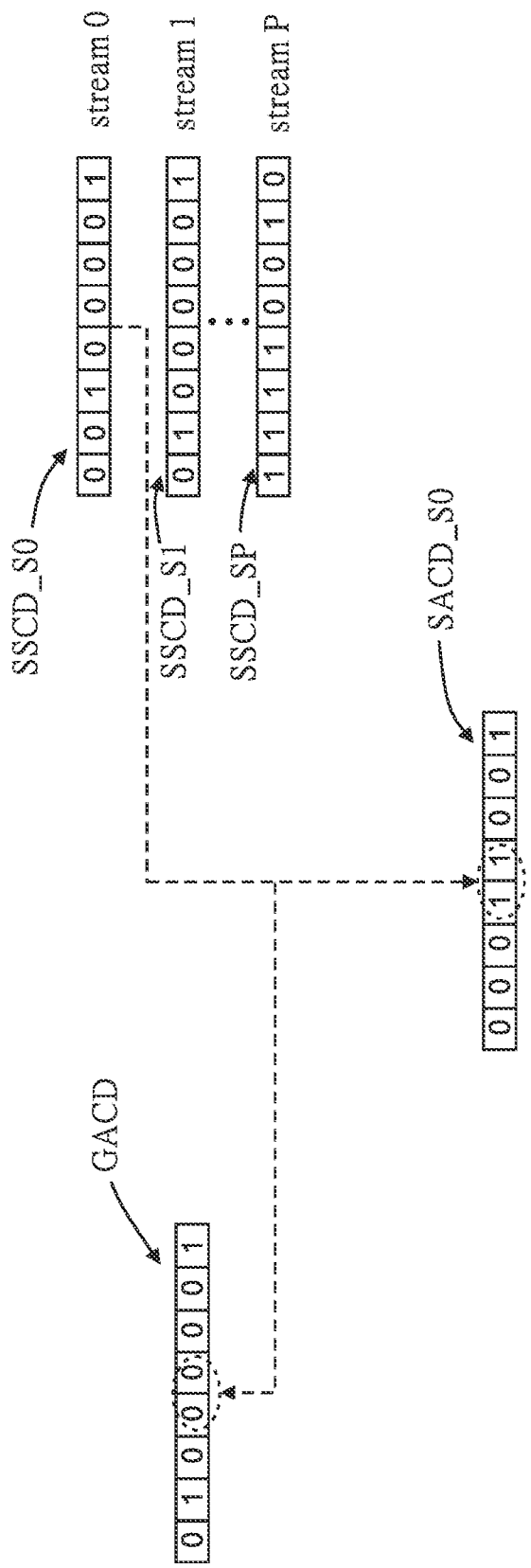
FIG. 6 is a schematic diagram of an embodiment of step S30 to step S50 in FIG. 3.

FIG. 6 shows a schematic diagram of an embodiment of step S30 to step S50 in FIG. 3. According to step S30, the controller 100 selects an available channel according to the stream available channel status data SAC0_S0 for the stream 0. As shown in FIG. 6, the stream available channel status data SACD_S0 is "00011001", and this example means that there are currently channels 3, 4 and 7 available for writing the data of the stream 0, and the controller 100 can select one or all of the channels 3, 4 and 7 to write the data of the stream 0. In the example shown in FIG. 6, the controller 100 selects the bits 3 and 4 (e.g., indicated by a dotted circle) to indicate that the available channels selected are the channels 3 and 4. The controller 100 correspondingly assigns the channels 3 and 4 to store the data of the stream 0. According to step S40, the controller 100 updates the global available channel status data (GACD) with respect to the available channels selected (e.g., the channels 3 and 4) to indicate that the available channels selected (e.g., the channels 3 and 4) have been assigned for stream data writing. In the example of FIG. 6, the bits corresponding to the channels 3 and 4 in the global available channel status data (GACD) are set to bits 0, and the updated global available channel status data (GACD) is "01000001". On the other hand, according to step S50, the stream suitable channel status data SSCD_S0 for the stream 0 is updated with respect to the available channel selected (e.g., the channels 3 and 4) to indicate that the available channel selected has been assigned for stream data writing for the stream 0. In the example in FIG. 6, the bits corresponding to the channels 3 and 4 in the stream suitable channel status data SSCD_S0 are set to bits 0, and the updated stream suitable channel status data SSCD_S0 is "00100001".

Figure 7:
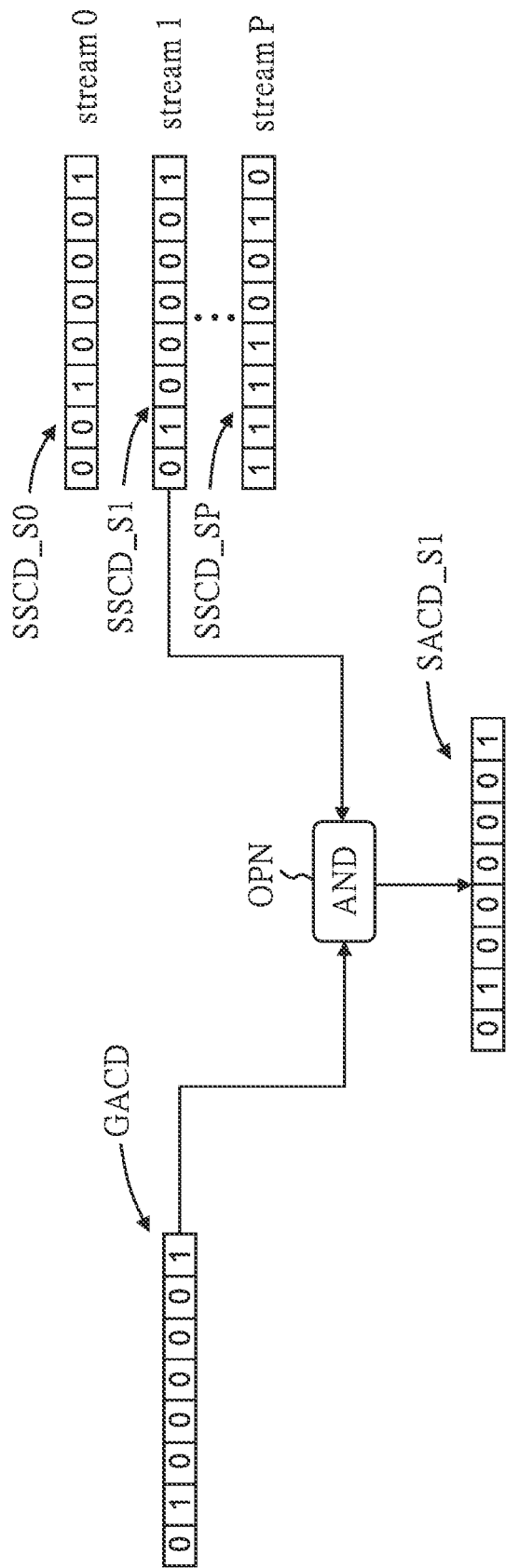
FIG. 7 is a schematic diagram of an embodiment of step S20 in FIG. 3 performed for another stream.

In some embodiments, after the controller 100 performs the steps (b) to (e) for one of the plurality of streams, the controller 100 performs the steps (b) to (e) for another of the plurality of streams. FIG. 7 shows a schematic diagram of an embodiment of step S20 in FIG. 3 performed for another stream (e.g., the stream 1). Following the examples from FIG. 4 to FIG. 6, as illustrated in FIG. 7, according to step S20, the controller 100 performs the data operation OPN above to generate the stream available channel status data SACD_S1 for the stream 1, based on the global available channel status data GACD and the stream available channel status data SSCD_S1 for the stream 1. As shown in FIG. 7, the global available channel status data (GACD) is "01000001", the stream suitable channel status data SSCD_S1 for stream 1 is "01000001", and the stream available channel status data SACD_S1 is "01000001".

Figure 8:
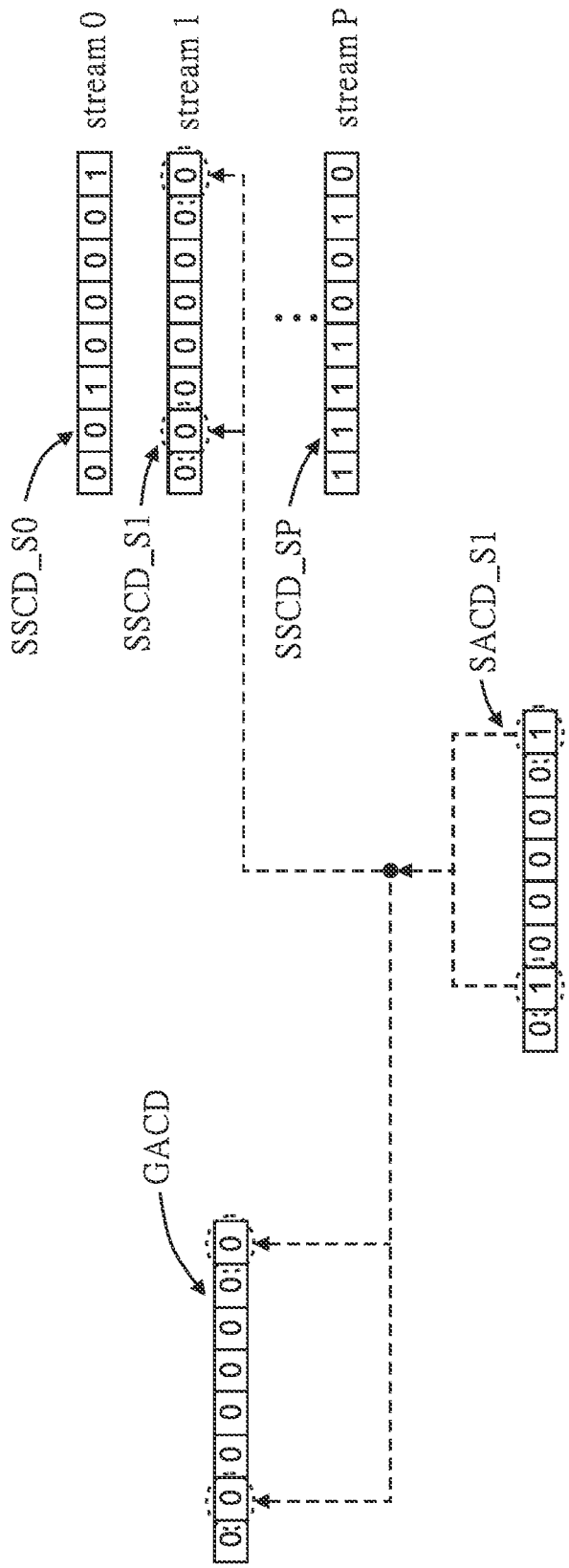
FIG. 8 is a schematic diagram of an embodiment of step S30 to step S50 in FIG. 3 performed for another stream.

FIG. 8 shows a schematic diagram of an embodiment of step S30 to step S50 in FIG. 3 performed for another stream (e.g., the stream 1). According to step S30, the controller 100 selects an available channel according to the stream available channel status data SACD_S1 for the stream 1. As shown in FIG. 8, the stream available channel status data SACD_S1 is "01000001", and this example indicates that there are currently channels 1 and 7 available for writing the data of the stream 1, and the controller 100 may select one or both of the channels 1 and 7 to write the data of the stream 1. In the example shown in FIG. 8, the controller 100 selects the bits 1 and 7 (e.g., indicated by dotted circles) to indicate that the available channels selected are the channels 1 and 7. The controller 100 correspondingly assigns the channels 1 and 7 to store the data of the stream 1. According to step S40, the controller 100 updates the global available channel status data (GACD) with respect to the available channels selected (e.g., the channels 1 and 7) to indicate that the available channels selected (e.g., the channels 1 and 7) have been assigned for stream data writing. In the example in FIG. 8, the bits corresponding to the channels 1 and 7 in the global available channel status data (GACD) are set to bits 0, and the updated global available channel status data (GACD) is "00000000". On the other hand, according to step S50, the stream suitable channel status data SSCD_S1 for the stream 1 is updated with respect to the available channel selected (e.g., the channels 1 and 7) to indicate that the available channel selected has been assigned for stream data writing for the stream 1. In the example in FIG. 8, the bits corresponding to the channels 1 and 7 in the stream suitable channel status data SSCD_S1 are set to bits 0, and the updated stream suitable channel status data SSCD_S1 is "00000000".

Figure 9:
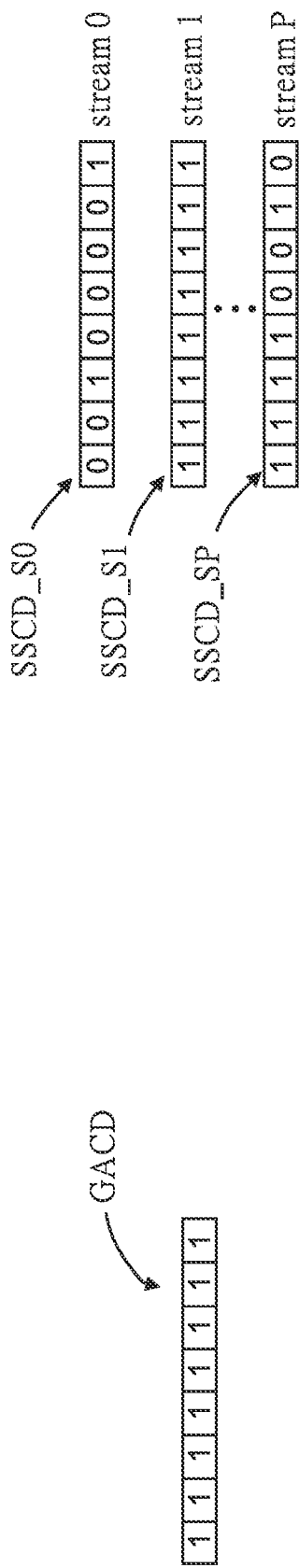
FIG. 9 is a schematic diagram of another embodiment of the method in FIG. 3.

FIG. 9 shows a schematic diagram of the method in FIG. 3 according to another embodiment. Following the example in FIG. 8, as shown in FIG. 8, when the contents (e.g., "00000000") of the stream suitable channel status data (e.g., SSCD_S1) for a stream (e.g., the stream 1) indicate that the data (at least in part) of the stream is evenly assigned to all the channels after one round of assignment for the stream (for example, performing steps S20 to S50 for once or more), as shown in FIG. 9, the contents of the stream suitable channel status data (e.g., SSCD_S1) for the stream (e.g., the stream 1) are reset, for example, to "11111111", to indicate that it is ready for the assignment to be performed subsequently for the data of the stream 1 by repeating steps S20 to S50. In some application scenarios, it is possible that the stream 1 contains new write data after the current round of assignment is completed for the stream, or it is possible that the data of the stream 1 contains write data not yet assigned after the current round of assignment for the stream. In some other application scenarios, after the contents of the stream suitable channel status data (e.g., SSCD_S1) of the stream (e.g., the stream 1) are reset, the stream 1 may be designated to represent a stream of another application program or the same application program.

Further, as shown in FIG. 8, when the contents (e.g., "00000000") of the global available channel status data (GACD) indicate that the data (at least in part) of at least stream is evenly assigned to all the channels after one round of assignment (for example, performing steps S20 to S50 for once or more for at least one or more streams) for the plurality of channels (e.g., the channels 0 to 7) and the plurality of streams (in overall), as shown in FIG. 9, the contents of the global available channel status data (GACD) are reset, for example, to "11111111", to indicate that it is ready for the assignment to be performed by repeating steps S20 to S50 for the data of the stream that exists subsequently. In some application scenarios, it is possible that there is a stream (e.g., the stream 0 and the stream P) still containing write data after the current round of assignment is completed in overall, or it is possible that new stream data exists after the current round of assignment in overall.

In some embodiments, after step S50, optionally, the method further includes: sending a notification to perform write operation for the stream and the available channel selected. For example, the controller 100 can be configured or programmed to, after updating the stream suitable channel status data (e.g., SSCD_S0) for one stream (e.g., the stream 0 shown in the embodiment in FIG. 6), send in the controller 100 an internal notification for performing the write operation for the stream (e.g., the stream 0) and the available channel selected (e.g., the channels 3 and 4). For example, referring to FIG. 1 and FIG. 3, when the flash translation layer 320 in FIG. 3 is implemented in the controller 100, the flash translation layer 320 includes modules handling different functions, for example, a module based on the method in FIG. 3 (for example, referred to as a "stream data assigning module"), a data write module and other modules. For this embodiment, after the stream suitable channel status data SSCD_S0 of the stream 0 is updated, the stream data assigning module in the controller 100 sends an internal notification for performing the write operation for the stream 0 and the available channels 3 and 4 selected to the data write module, and the data write module is activated to perform an associated data write operation. Moreover, the controller 100 can be configured or programmed to, after updating the stream suitable channel status data (e.g., SSCD_S1) for another stream (e.g., the stream 1 shown in the embodiment in FIG. 8), send in the controller 100 an internal notification for performing the write operation for the stream (e.g., the stream 1) and the available channel selected (e.g., the channels 1 and 7).

In one embodiment, optionally, the method further includes: when the global available channel status data (GACD) (e.g., "00000000") indicates that each of the plurality of channels has been assigned for stream data writing, sending a notification to perform a write operation for the plurality of channels. For example, the controller 100 can be configured or programmed that, when the global available channel status data (GACD) is "00000000", the stream data assigning module in the controller 100 issues an internal notification for performing the write operation for all the channels, and the data write module is activated to perform an associated data write operation.

Figure 10:
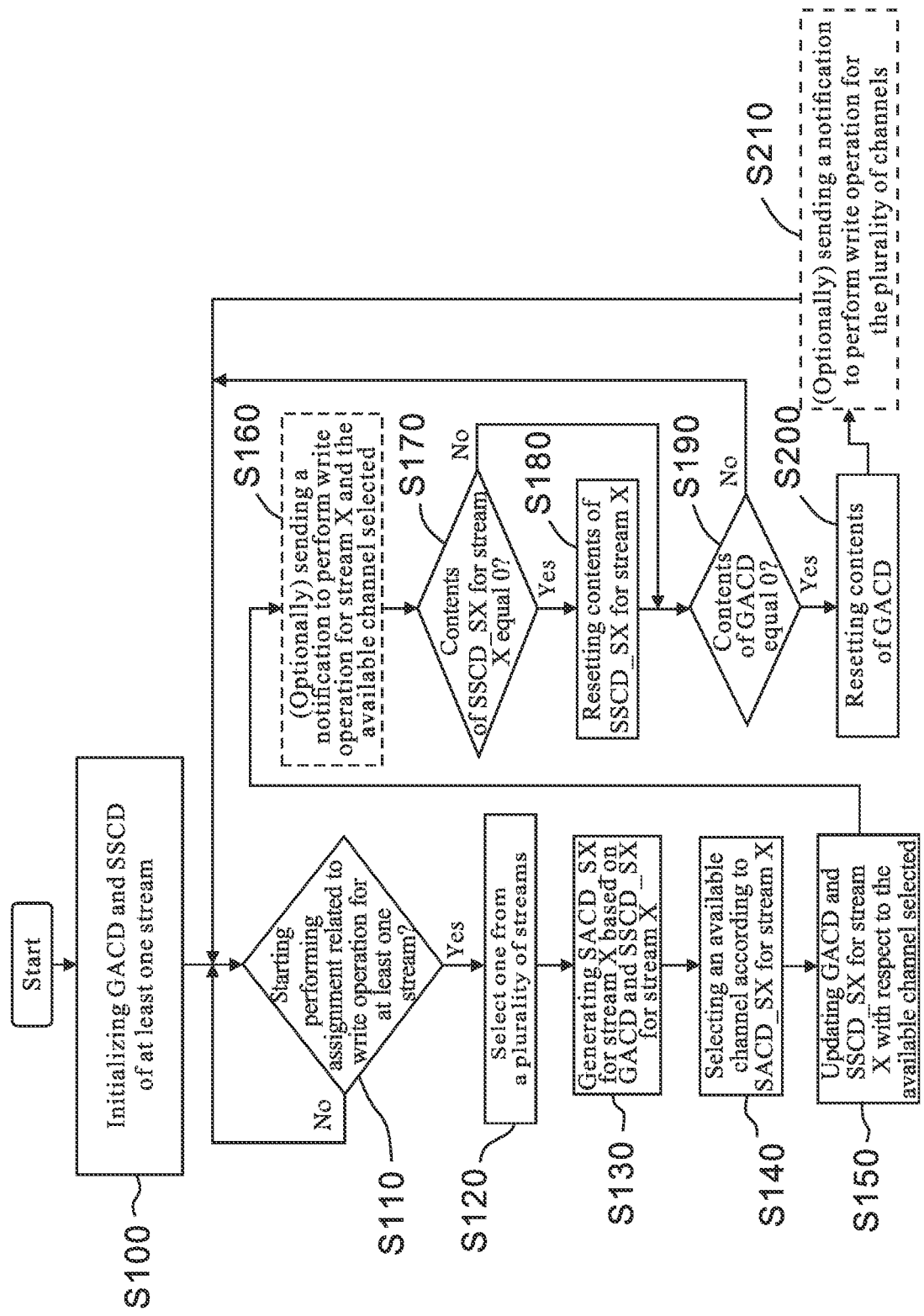
FIG. 10 is a flowchart of another embodiment based on the method in FIG. 3.

FIG. 10 shows a flowchart of another embodiment based on the method in FIG. 3. The method in FIG. 10 is applicable to the storage device including the controller 100 and the memory 200, as shown in FIG. 1. The controller 100 is coupled to the plurality of memory chips (for example, M memory chips for each channel, that is, a total of N×M memory chips) through a plurality of channels (e.g., N channels), and is for processing stream data writing of a plurality of streams.

As shown in step S100, the controller 100 provides global available channel status data (GACD) and stream suitable channel status data (SSCD) for at least one of the plurality of streams. The meaning of the two types of status is, for example, as described in the example in step S10 in FIG. 3. For example, a bitmap is used to represent the two types of status data. During initialization, all bits of the global available channel status data (GACD) are set to 1, and all bits of the stream suitable channel status data (SSCD) for at least one stream are set to 1.

As shown in step S110, the controller 100 determines, according to at least one criterion, whether to start performing the assignment related to a write operation according to steps S20 to S50 in FIG. 3 to assign stream data in a write buffer for at least one stream. In this embodiment, the criterion is optional or flexible, and may be designed according to a scheduling policy of the controller 100 in the implementation; it should be noted that the implementation of the present invention is not limited to such criterion. In some embodiment, the criterion can be whether an amount related to stream data in the write buffer is greater than or equal to a buffer threshold. In addition, the amount related to stream data may indicate the data amount of a stream, the total data amount of all current stream data, the total number of streams, or other appropriate parameters. For example, when the amount related to stream data (for example, the total number of streams) is greater than the buffer threshold (for example, 3), the determination result of step S110 is yes; otherwise, the determination result is no. Moreover, in another embodiment, the criterion can be whether an idle time is greater than or equal to a time threshold. If the idle time is greater than or equal to the time threshold, the determination result of step S110 is yes; otherwise, the determination result is no. If the determination result of step S110 is yes, the following steps are performed.

As shown in step S120, one of the streams is selected. Assuming there are P+1 streams (where P is a non-zero positive integer), one stream X (wherein X>=0 or X<=P) from the streams 0 to P is selected. In this embodiment, the criterion for stream selecting in step S120 is optional or flexible, and may be chosen according to the scheduling policy of the controller 100 in the implementation. For example, the criterion for stream selecting can be determined according to a priority, waiting time, data amount or other relevant and appropriate parameter, which is related to the streams, or according to multiple parameters. The implementation of the present invention is not limited to the criterion for stream selecting above.

As shown in step S130, the controller 100 generates, based on the global available channel status data (GACD) and the stream suitable channel status data (SSCD_SX) for the stream X, stream available channel status data (e.g., SACD_SX) for the stream X, wherein the stream available channel status data SACD_SX for the stream X indicates whether each of the N channels is available for stream data writing for the stream X.

As shown in step S140, the controller 100 selects an available channel according to the stream available channel status data SACD_SX for the stream X. For example, the embodiments in FIG. 5 or FIG. 7 can be taken.

As shown in step S150, the global available channel status data (GACD) is updated with respect to the available channel selected in step S140, to indicate that the available channel selected has been assigned for stream data writing. Similarly, the stream suitable channel status data SSCD_SX for the stream X is updated to indicate that the available channel selected has been assigned for stream data writing for the stream. Step S150 is performed on the basis of steps S40 and S50 in FIG. 3. For example, refer to the embodiment in FIG. 6 or FIG. 8.

As shown in step S160, after step S150, optionally, the method in FIG. 10 can further include sending a notification to perform write operation for the stream X and the available channel selected in step S140. For example, refer to the associated embodiment in FIG. 6 or FIG. 8.

As shown in step S170, the controller 100 determines whether the contents of the stream suitable channel status data SSCD_SX for the stream X indicate that the data (at least in part) of the stream X has been evenly assigned to all the channels. If the contents of the stream suitable channel status data SSCD_SX are, for example, "00000000", the determination result of step S170 is yes; otherwise, the determination result of step S170 is no. Step S180 is performed if the determination result of step S170 is yes. Step S190 is performed if the determination result of step S170 is no.

As shown in step S180, the controller 100 resets the contents of the stream suitable channel status data SSCD_SX for the stream X, for example, resetting to "11111111". Refer to the embodiments in FIG. 8 and FIG. 9 associated with resetting the status data.

As shown in step S190, the controller 100 determines whether the contents of the global available channel status data (GACD) indicate, after one round of overall assignment has been performed for the N channels and the at least one stream selected (which may be a part or all of the P+1 streams), whether the data of the stream selected has been evenly assigned to all the channels. If the contents of the global available channel status data (GACD) are, for example, "00000000", the determination result of step S190 is yes; otherwise, the determination result of step S190 is no. Step S200 is performed if the determination result of step S190 is yes. If the determination result of step S190 is no, starting from step S110, step S120 and the subsequent process are performed for another stream selected, so as to perform assignment for stream data writing for individual streams.

As shown in step S200, the controller 100 resets the contents of the global available channel status data (GACD), for example, resetting to "11111111". Refer to the embodiments in FIG. 8 and FIG. 9 associated with resetting the status data.

As shown in step S210, optionally, after step S200, the method in FIG. 10 can further include sending a notification to perform a write operation for the plurality of channels. For example, the controller 100 can be configured or programmed that, the stream data assigning module in the controller 100 sends an internal notification to the data write module for performing the write operation for all the channels, and the data write module is activated to perform the associated data write operation. For example, refer to the embodiments associated with sending a notification.

In the embodiment of the method in FIG. 10 above, steps S160 and S210 are optional, and therefore in some embodiments, step S170 may follow after step S150; and/or, after step S200, subsequent steps for assigning write data of a stream selected may follow, starting from step S110 or S120.

Figure 11:
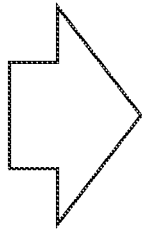
FIG. 11 is a schematic diagram of an example of a write data arrangement obtained by applying the method in FIG. 10.

FIG. 11 shows a schematic diagram of an example of a write data arrangement obtained by applying the method for a storage device in FIG. 10. As depicted by the plurality of horizontally arranged grids on the upper part of FIG. 11, a write buffer WB of the storage device has a plurality of pieces of stream data (e.g., for 5 streams), wherein the denotation in each grid, for example, "S1, 0" represents the zeroth data page of the stream 1 (or referred to as a data page 0 of the stream 1), "S1, 1" represents the first page of the stream 1 (or referred to a data page 1 of the stream 1), "SX, Y" represents the $Y^{th}$ page of the stream X (or referred to as a data page Y of the stream X), and X and Y are non-negative integers. The grid array (for example, a 8×4 grid array) at the bottom part of the FIG. 11 represents a schematic diagram of an example of a write data arrangement WSA obtained by assigning the data of 5 streams in the write buffer WB using the method for a storage device in FIG. 10. In FIG. 11, each of the grids of each vertical column of write data arrangement WSA corresponds to a storage position provided by one channel (for example, any of the channels 0 to 7), and the plurality of storage positions are in a unit of pages. For example, the leftmost vertical column represents storage positions 0 to 3 provided by the channel 0, and stores from top to bottom a data page 0 (S1, 0) of the stream 1, a data page 3 of the stream 3 (S3, 3), a data page 3 of the stream 2 (S2, 3) and a data page 3 of the stream 4 (S4, 3). Since the meaning of the grids of the other vertical columns can similarly be derived from above, the details will not be described herein. For the sake of illustration, FIG. 11 shows only a part of the storage positions provided by each channel. Moreover, the storage positions provided by each channel may be implemented by one or more memory chips. It should be noted that the description of the example shown in FIG. 11 is for explaining an example of an arrangement to which the method for a storage device in FIG. 10 is applicable, and the implementation of the present invention is not limited to the example.

Figure 12:
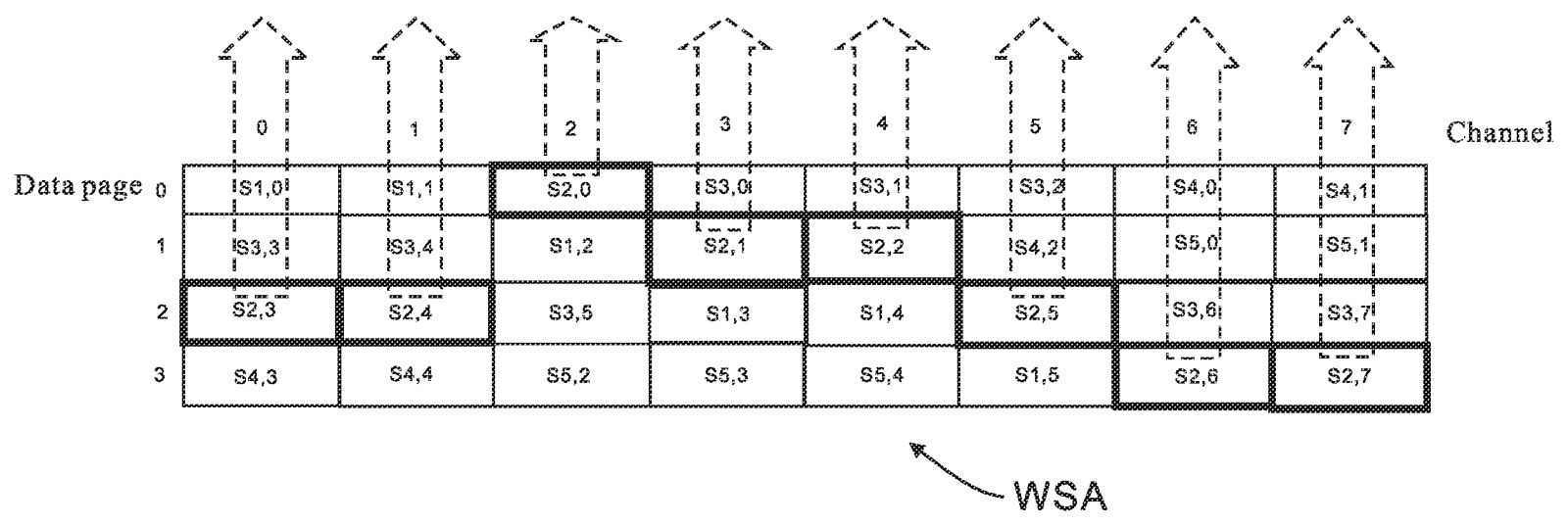

Referring to FIG. 11, the stream 2 has write data of the pages 0 to 7. Thus, by applying the method for a storage device of FIG. 10 to the stream 2, the controller 100 can evenly assign the write data of the pages 0 to 7 of the stream 2 to the channels 0 to 7; for example, the grids in bold frames in the write data arrangement WSA show that the data pages of the stream 2 are assigned to the storage positions of the channels 0 to 7. FIG. 12 shows a schematic diagram of an example when a particular stream (for example, the stream 2) of data is output by a storage device according to the example of the write data arrangement of FIG. 11. As shown in FIG. 12, the write data arrangement WSA has grids in bold frames with arrows pointing upwards; this illustrates that a plurality of data pages of the stream 2 can be simultaneously and respectively read from the storage positions of the channels 0 to 7. In contribution to such parallel processing, reading efficiency can be enhanced. Moreover, in the example shown in FIG. 11, the stream 3 also has write data of the pages 0 to 7, and so the similar effect can also be achieved.

In a practical application scenario, the respective total data amounts of the streams may be different. For example, the stream 1 has the pages 0 to 5, and each of the streams 4 and 5 has the pages 0 to 4. Thus, by applying the method for a storage device of FIG. 10 to all of the streams 1 to 5, the data pages of each of the streams 1, 4 and 5 can also be evenly assigned to different channels. In overall, data of streams can be more evenly distributed and assigned to appropriate positions in channels, so as to provide better durability or improve performance, for example, achieving enhanced reading efficiency.

In some embodiments, a storage device provided includes a plurality of memory chips (for example, the memory 200 shown in FIG. 1) and a controller (for example, the controller 100 shown in FIG. 1). The controller is coupled to the plurality of memory chips through a plurality of channels, and is for processing stream data writing for a plurality of streams. The controller 100 is configured to perform a plurality of operations, which include the operations corresponding to steps S10 to S50 in the control method in FIG. 3. In some embodiments, the storage device can further be configured or programmed to implement at least one or a combination of the plurality of embodiments based on the method in FIG. 3. The storage device may be implemented as a solid storage device (SSD), a universal flash storage (UFS), an embedded multimedia card (eMMC), or any other appropriate storage device or a product based on a storage device.

Moreover, in the embodiments (for example, FIG. 1 and FIG. 2) associated with a storage device above, at least one or a combination of the processing unit 110, the channel control unit 140 and the host interface unit 150 may be implemented by one or more circuits, for example, a microprocessor, a processor, or a digital signal processor. Alternatively, the units above may be designed based on Hardware Design Language (HDL) or techniques of other design approach for digital circuits general known to a person skilled in the art, and may be implemented by one or more of circuits based on such as a field programmable gate array (FPGA), an application-specific integrated circuit (ASIC) or a complex programmable logic device (CPLD), or be implemented by a dedicated circuit or module. In addition, the channel control unit may be implemented in the form of software such as a process, thread or programming module or other software approach. However, the implementation of the present invention is not limited to the examples above. Moreover, steps S10 to S50 in FIG. 3, and the steps in FIG. 4 to FIG. 9 or FIG. 10 may also be implemented by hardware circuits, for example, implemented by a logic circuit or other appropriate digital circuits.

Further, in some embodiments, a non-transient storage medium is provided. The non-transient storage medium records program instructions that are capable of causing a computing device (for example, the storage device shown in FIG. 1 or FIG. 2) to perform the method for assigning a plurality of channels of a storage device for stream data writing by a controller in the storage device, wherein the method includes any one or a combination of the embodiments of the method according to FIG. 3. For example, the program instructions are one or more programs or program modules, and are for, for example, performing steps S10 to S50 in FIG. 3, steps in FIG. 4 to FIG. 9 or FIG. 10. The program instructions of the modules perform operations in collaboration, and may be executed in any appropriate order or in parallel. When the computing device executes the program instructions, the computing device is caused to perform an embodiment of the method for assigning a plurality of channels of the storage device for performing write data streaming based on FIG. 3. The readable storage medium above may be firmware, a ROM, a RAM, a memory card, an optical information storage medium, a magnetic information storage medium, or any other types of storage media or memories; the implementation of the present invention is not limited to the examples above.

Accordingly, the embodiments provide a method for assigning a plurality of channels of a storage device for stream data writing, a storage device and a storage medium, which are capable of implementing assignment related to write operations and are suitable for processing write operations of a plurality of streams of application programs from a host to provide individual assignment for the write operation of at least one of the streams, hence facilitating more even distribution and storage of write data corresponding to the stream in memory chips of a plurality of channels of a storage device. Thus, the improvement on the performance of reading the data of the stream from the storage device can be facilitated.

While the present disclosure has been described by means of specific embodiments, numerous modifications and variations could be made thereto by those skilled in the art without departing from the scope and spirit of the present disclosure set forth in the claims.

What is claimed is:

1. A method for assigning a plurality of channels of a storage device for stream data writing, the method comprising:
   (a) providing global available channel status data and stream suitable channel status data for one of a plurality of streams by a controller of the storage device for processing stream data writing for the plurality of streams, wherein the global available channel status data indicates whether each of the plurality of channels has been assigned for stream data writing, and the stream suitable channel status data indicates whether each of the plurality of channels has been assigned for stream data writing for the one of the plurality of streams;
   (b) generating, by the controller, stream available channel status data for the one of the plurality of streams, based on the global available channel status data and the stream suitable channel status data for the stream, wherein the stream available channel status data for the stream indicates whether each of the plurality of channels is available for stream data writing for the one of the plurality of streams;
   (c) selecting, by the controller, at least one available channel of the plurality of channels according to the stream available channel status data for the stream;
   (d) updating the global available channel status data with respect to the at least one available channel selected to indicate that the at least one available channel selected has been assigned for stream data writing; and
   (e) updating the stream suitable channel status data for one of the plurality of streams with respect to the at least one available channel selected to indicate that the at least one available channel selected has been assigned for stream data writing for the one of the plurality of streams.

2. The method according to claim 1, wherein the controller is used to assign the plurality of channels for the plurality of stream data writing, and provide respective stream suitable channel status data for the plurality of streams.

3. The method according to claim 2, wherein after the controller performs the steps (b) to (e) for the one of the plurality of streams, and the controller performs the steps (b) to (e) for another of the plurality of streams.

4. The method according to claim 1, wherein after the step (e), the method further comprises sending a notification to perform stream data writing for the one of the plurality of streams and the at least one available channel selected.

5. The method according to claim 1, wherein the method further comprises: when the global available channel status data indicates that each of the channels has been assigned for stream data writing, sending a notification to perform stream data writing for the plurality of channels.

6. A storage medium, which stores program instructions that are capable of causing a storage device to perform the method for assigning a plurality of channels of a storage device for stream data writing according to claim 1.

7. A storage device, comprising:
   a plurality of memory chips; and
   a controller, coupled to the plurality of memory chips through a plurality of channels, for processing stream data writing for a plurality of streams, wherein the controller is configured to perform a plurality of operations comprising:
   (a) providing global available channel status data and stream suitable channel status data for one of the plurality of streams, wherein the global available channel status data indicates whether each of the channels has been assigned for stream data writing, and the stream suitable channel status data indicates whether each of the plurality of channels has been assigned for stream data writing for the one of the plurality of streams;
   (b) generating stream available channel status data for the one of the plurality of streams, based on the global available channel status data and the stream suitable channel status data for the one of the plurality of streams, wherein the stream available channel status data for the one of the plurality of streams indicates whether each of the channels is available for stream data writing for the one of the plurality of streams;
   (c) selecting at least one available channel according to the stream available channel status data;
   (d) updating the global available channel status data with respect to the at least one available channel selected to indicate that the at least one available channel selected has been assigned for stream data writing; and
   (e) updating the stream suitable channel status data for the stream with respect to the at least one available channel selected to indicate that the at least one available channel selected has been assigned for stream data writing for the one of the plurality of streams.

8. The storage device according to claim 7, wherein the controller is used to assign the plurality of stream data writing requests for a plurality of streams, and provide respective stream suitable channel status data for the plurality of streams.

9. The storage device according to claim 8, wherein after the controller performs the operations (b) to (e) for the one of the plurality of streams, and the controller performs the operations (b) to (e) for another of the plurality of streams.

10. The storage device according to claim 7, wherein after the operation (e), the plurality of operations further include sending a notification to perform stream data writing for the one of the plurality of streams and the at least one available channel selected.

11. The storage device according to claim 7, wherein the plurality of operations further include: when the global available channel status data indicates that each of the channels has been assigned for stream data writing, sending a notification to perform stream data writing for the plurality of channels.

* * * * *